H. J. FRERKS.
DIRECTION PREDICTER FOR VEHICLES.
APPLICATION FILED MAR. 1, 1915.
1,184,090.
Patented May 23, 1916.
2 SHEETS—SHEET 1.
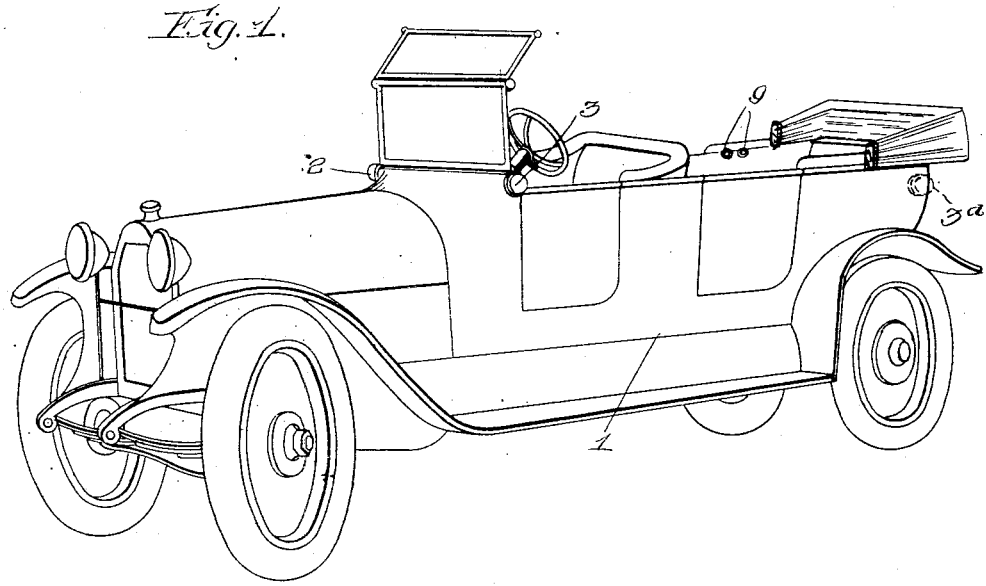
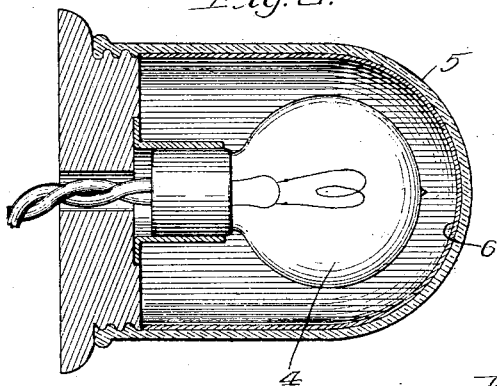
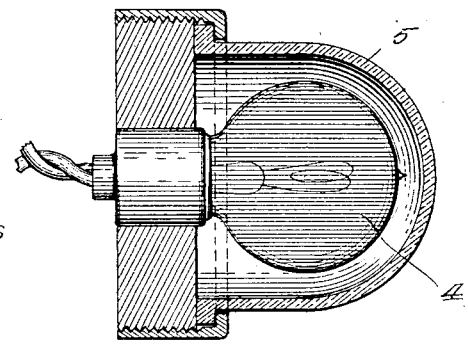
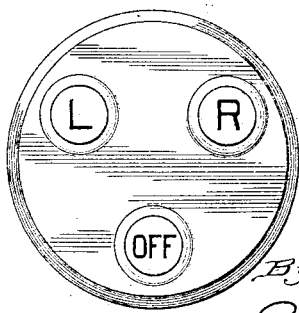
Witnesses:
Inventor:
Henry J. Frerks
By Albert Scheib, Atty H. J. FRERKS.
DIRECTION PREDICTER FOR VEHICLES.
APPLICATION FILED MAR. 1, 1915.
1,184,090.
Patented May 23, 1916.
2 SHEETS—SHEET 2.
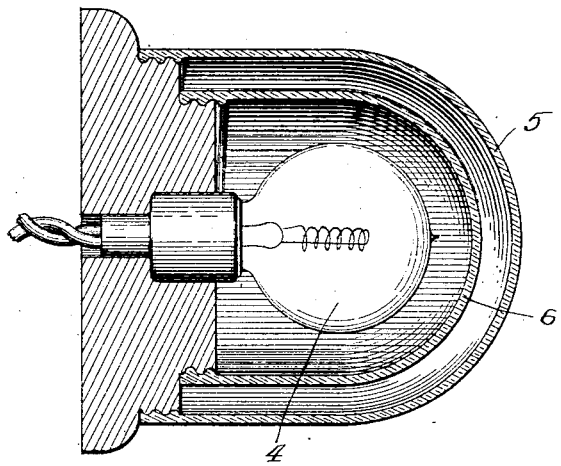
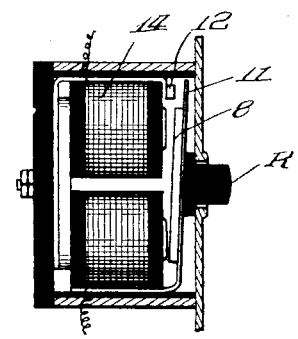
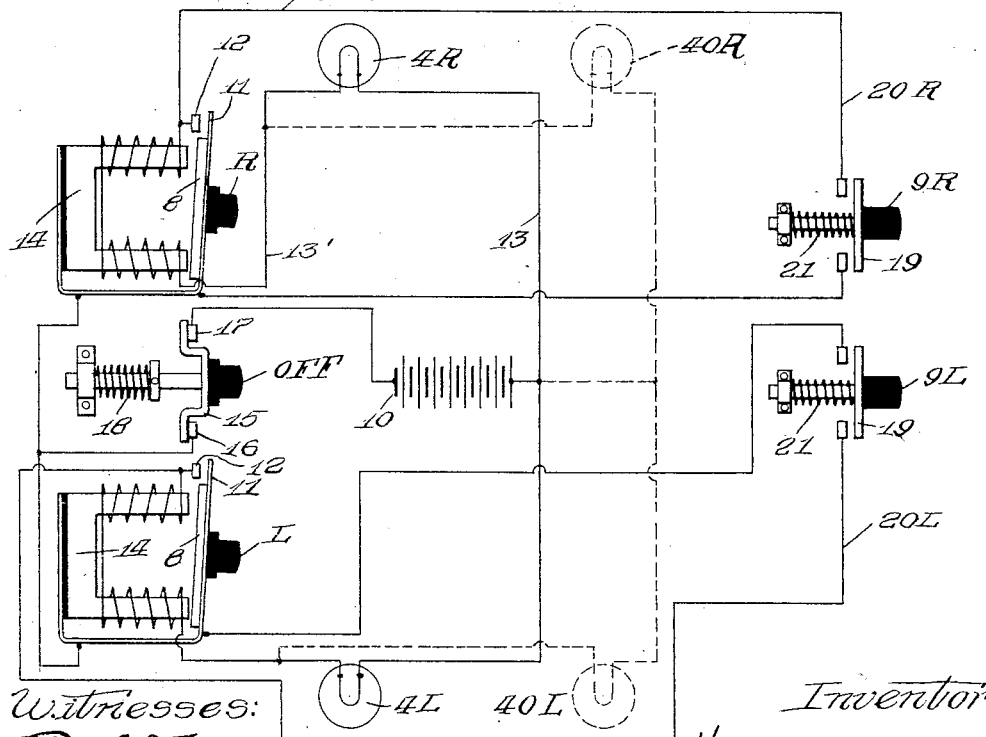
Witnesses:
Inventor:
Henry J. Frerks
By Albert Scheible Atty.

UNITED STATES PATENT OFFICE.

HENRY J. FRERKS, OF CHICAGO, ILLINOIS.

DIRECTION-PREDICTER FOR VEHICLES.

1,184,090. Specification of Letters Patent. Patented May 23, 1916.

Application filed March 1, 1915. Serial No. 11,143.

*To all whom it may concern:*

Be it known that I, HENRY J. FRERKS, citizen of the United States, residing at Chicago, in the county of Cook and State of Illinois, have invented certain new and useful Improvements in Direction-Predicters for Vehicles; and I do hereby declare the following to be a full, clear, and exact description of the invention, such as will enable others skilled in the art to which it appertains to make and use the same.

My invention relates to means for informing parties on or along a highway of an intended change of direction, or proposed stopping, of a conveyance, such as a vehicle.

Generally speaking, its objects are to provide a signaling system which may readily be applied to any vehicle: which can easily be operated even by a novice: which will be equally effective by day and by night: which will be inexpensive both in installation and in operation: and which will easily be distinguished from the various danger signals and lighting effects heretofore used.

In short, my invention aims to provide a signaling system which will combine the most desirable qualities and which may therefore be adopted as a standard by both municipalities and States in legislation aimed at expediting traffic and reducing accidents.

While my invention may be utilized for many kinds of conveyance and in widely varying embodiments, it is particularly suited for use with vehicles, in connection with which its aims would include: (1) Providing signal members so placed on the vehicle that any calling of attention to these signal members will be self-explanatory as to the change of direction or movement predicted thereby. (2) Providing simple means for calling attention to such signal members by a decided change in their color. (3) Utilizing a color not heretofore in common use upon vehicles or conveyances of any kind, which color may therefore be adopted as a standard color for indicating a proposed change of direction, or a proposed stopping, of the vehicle. (4) Providing means whereby either the driver of the vehicle or some other occupant of the latter may start the desired signaling, thereby enabling such occupant to guide the course of the vehicle without conversing with the driver. (5) Providing means whereby the driver may discontinue the signaling regardless of whether the same was started by him or by some other occupant of the vehicle.

Further objects will appear from the following specification and from the accompanying drawings, in which—

Figure 1 is a view of a vehicle equipped with my invention. Figs. 2, 3 and 5 are fragmentary views of three different types of signal elements suitable for use with my invention. Fig. 4 shows the front of a chauffeur's control switch used with my invention. Fig. 6 is a section through another embodiment of a chauffeur's control switch suited for use with my invention. Fig. 7 is a diagram showing the circuit connections for an embodiment of my invention.

In accomplishing the above itemized purposes in connection with an automobile 1, I mount at the right side of the latter at least one signal element 2 and at its left side at least one signal element 3. Where a single such element is used at each side, the same is preferably placed in proximity to the edge of the dashboard, where it can be seen by the chauffeur while also visible to other drivers who may be either in front or behind this automobile, or to pedestrians anywhere near the vehicle. Where two such elements are used at each side, the auxiliary elements (such as 3ª in Fig. 1) are preferably mounted on or near the rear of the vehicle body. Each of these signal elements comprises a lamp 4, an outer casing 5 of translucent but non-transparent material (such as an opalescent or frosted glass), and a color screen 6 interposed between the lamp and the casing. The color screen 6 may be integral with the casing 5 (as in Fig. 2), or with the bulb of the lamp (Fig. 3), or it may be a separate element as in Fig. 5. In either case, it is preferably blue, thereby affording a color which will be easily recognized and which will not readily be confused with the red, white or green lamps in common use for other purposes.

Mounted within easy reach of the chauffeur is a control switch 7, preferably in the form of a triple-push switch having buttons labeled respectively "L," "R" and "Off." The former two buttons are connected to magnet armatures 8 carrying contacts, so that pressing either one will not only close a circuit but also move the armature to a position in which it will be held by the flow current until the latter is interrupted. The third or "off" button controls an interrupter so connected to the circuits as to interrupt either or both of these circuits. Connected in shunt with the contacts closed by movement either of the said armatures 8 is an auxiliary circuit-closer 9 mounted within easy reach of an occupant of the car, as shown for example in Fig. 1.

With circuit connections as in Fig. 7, the operation is as follows: The battery 10 is connected to both the right and left-hand lamps 4R and 4L by circuits which are respectively open at the contacts controlled by the push-buttons R and L of the chauffeur's control switch. If the chauffeur intends to turn to the right, he presses the R button, thereby causing the contact 11 to engage the contact 12, so as to close the circuit 13 through the lamp 4R (and also through the lamp 40R if there are two lamps at the right side of the vehicle), thereby lighting the right-hand lamp (or lamps) causing the light of the same to diffuse the distinctive blue coloring through the translucent casing (or casings) housing the same. The circuit thus closed includes an electro-magnet 14 associated with the armature 8, which magnet is thereby energized so as to hold the armature in position after it has been digitally moved, thereby keeping the circuit closed through the contacts 11 and 12. As soon as the proposed turn of the vehicle has been completed, the chauffeur presses the "off" button, thereby moving a spring-pressed contact bar 15 away from contacts 16 and 17 forming parts of the circuit, so this interrupts the circuit momentarily, deënergizing the magnet 14 and permitting the resiliency of the contact member 11 to move the armature 8 and the tip of the contact member 11 to their original position, so that a discontinuing of the pressure on the "off" button will still leave the circuit open and the lamp 4R turned out.

Instead of lighting the said lamp by means of the chauffeur's control button, this lamp may be lit by having an occupant of the vehicle press a button 9R for moving a contact bar 19 close to a circuit 20R shunting the contacts 11 and 12, which contact bar is normally held out of its said circuit-closing relation by a spring 21. Likewise, it will be evident from Fig. 7 that the left-hand lamp 4L (or lamps 4L and 40L) may be lit either by having the chauffeur press the "L" button, or by having some one else press the button 9L to close the magnet circuit through a conductor 20L; so also by pressing both buttons either at the chauffeur's or at the occupant's positions, the lamp or lamps on both sides of the vehicle may be lit so as to indicate the proposed stopping of the vehicle and the standing still resulting therefrom. In any case a pressing of the "off" button by the chauffeur will extinguish any and all lamps thus lit, thereby canceling the signal indication.

In practice, the occupant of the car may leave the chauffeur free to drive as he pleases, or may give directions to the chauffeur by pressing one or the other or both of the auxiliary buttons, thereby lighting the corresponding lamp or lamps so as to advise the chauffeur of a desired turn to the right or left or of a desired stop. However, such opportunities for visually signaling the chauffeur (thereby avoiding the difficulty of making the latter hear instructions on noisy streets or in high winds) will not interfere with the chauffeur's being able to give similar signals himself, nor with the chauffeur's entire control of the extinguishing of the signals. By making the outer portion of each signal member white or substantially colorless, the latter will not ordinarily be noticeable, although immediately presenting the characteristic deep blue color when the lamp of the said signal member is lit. Moreover, by using lamps of fairly high candle power, the blue signal color will also be clearly visible in the day time, so that my signal system can be used with equal effectiveness both by day and by night.

It will be evident from Fig. 7 that a single source of current and a simple set of circuits will suffice for carrying out my invention; likewise, from Figs. 2 and 3 that a blue coating either on the interior of the casing 5 or the exterior of the lamp bulb will suffice for interposing the desired color medium between the source of light and the said casing. However, I do not wish to be limited to these or other details of the embodiment herein disclosed, it being evident that the same may be modified in many ways without departing from the spirit of my invention, also that my invention may be applied equally well to motor-boats, airships or other type of conveyances regardless of whether these are used on land, on water, or in the air.

I claim:

1. Direction-predicting signals for a conveyance, including a pair of translucent but non-transparent and normally substantially colorless members so disposed at opposite sides of the conveyance as simultaneously to be visible by the guider of the conveyance and by persons at the front and rear thereof; coloring means for imparting a common distinctive color to each of said members; means mechanically operable by the guider of the conveyance and electrically operable by an occupant of the conveyance for actuating the coloring means associated with each of said members, and means operable by said guider for discontinuing the actuating of said coloring means.

2. Signal means for a vehicle, including a source of current and at least one pair of lamps carried thereby, said lamps being so positioned that their respective locations will indicate the changes of direction predicted respectively by a lighting of one or the other thereof; magnetically operable circuit-closers carried by the vehicle within reach of the driver of the latter and each mechanically operable by said driver, auxiliary circuit-closers positioned for operation by an occupant of the vehicle, connections between the source of current and said circuit-closers for enabling an operation of the auxiliary circuit-closers to actuate said magnetic circuit-closers, circuits connecting the latter with the source of current and the respective lamps for causing the actuating of the magnetic circuit-closers respectively to close a lighting circuit through said lamps, manually operable means positioned within reach of said driver for interrupting the circuit connecting the said circuit closers, and means associated with each of said lamps for causing the lighting thereof to disclose a common and distinctive color.

In testimony whereof I have signed my name in presence of two subscribing witnesses.

HENRY J. FRERKS.

Witnesses:
 ALBERT RHEIBLE,
 D. KENTUICH.

Copies of this patent may be obtained for five cents each, by addressing the "Commissioner of Patents, Washington, D. C."